(12) United States Patent
Kuznetsov et al.

(10) Patent No.: US 8,004,720 B2
(45) Date of Patent: Aug. 23, 2011

(54) METHOD FOR ADAPTIVELY SCREENING CONTINUOUS TONE ORIGINALS

(76) Inventors: Jury Veniaminovich Kuznetsov, Saint-Petersburg (RU); Pavel Anatolievich Volneikin, Saint-Petersburg (RU)

( * ) Notice: Subject to any disclaimer, the term of this patent is extended or adjusted under 35 U.S.C. 154(b) by 563 days.

(21) Appl. No.: 12/084,286

(22) PCT Filed: Oct. 30, 2006

(86) PCT No.: PCT/RU2006/000565
§ 371 (c)(1),
(2), (4) Date: Jul. 2, 2008

(87) PCT Pub. No.: WO2007/053062
PCT Pub. Date: May 10, 2007

(65) Prior Publication Data
US 2009/0103141 A1  Apr. 23, 2009

(30) Foreign Application Priority Data
Oct. 31, 2005  (RU) ................................ 2005134511

(51) Int. Cl.
*H04N 1/405* (2006.01)
(52) U.S. Cl. ..................................... 358/3.14; 358/3.06
(58) Field of Classification Search .................. 358/1.9, 358/2.1, 3.06–3.19, 3.23–3.24, 3.21–3.22
See application file for complete search history.

(56) References Cited

U.S. PATENT DOCUMENTS

| | | | | |
|---|---|---|---|---|
| 5,221,971 A | * | 6/1993 | Allen et al. | 358/3.01 |
| 5,550,647 A | * | 8/1996 | Koike | 358/3.03 |
| 5,701,366 A | * | 12/1997 | Ostromoukhov et al. | 382/237 |
| 6,178,011 B1 | | 1/2001 | Lin et al. | |
| 6,760,126 B1 | * | 7/2004 | Kritayakirana et al. | 358/2.1 |

FOREIGN PATENT DOCUMENTS

| | | |
|---|---|---|
| EP | 0 946 049 A1 | 9/1999 |
| EP | 1 501 277 A1 | 1/2005 |
| RU | 2 126 598 C1 | 2/1999 |

\* cited by examiner

*Primary Examiner* — Thomas D Lee
*Assistant Examiner* — Stephen M Brinich
(74) *Attorney, Agent, or Firm* — Birch, Stewart, Kolasch & Birch, LLP

(57) ABSTRACT

The invention relates to printing, to facsimile and publishing techniques, in particular to picture reproducing systems capable to form two optical parameter levels, only. Said invention makes it possible to increase a fine detail reproduction accuracy, in particular, strokes on a screen copy and to more fully use a printing resolution power. The inventive method consists in converting a continuous tone original represented by multilevel reflection values of the areas thereof into a screen copy consisting of dark and light elements by using two types of weight values of the copy elements, wherein the first weight values are distributed between the elements in a sequence independent of the tone modification behavior through the original areas, and in the second sequence according to the geometry of the fine details thereof, in forming the copy elements in such a way that they are dark or light according to results of comparison between the reflection values of the original areas and the weight values of the first and second types, in increasing the degree of use of the second weight values for the fine strokes of the original with respect to the use thereof for single interfaces, which divide the original into dark and light regions and in removing elements which are established in a dark form according to the first weight values inside the light strokes arranged on a dark background.

4 Claims, 5 Drawing Sheets a   b a   b

METHOD FOR ADAPTIVELY SCREENING CONTINUOUS TONE ORIGINALS

FIELD OF THE INVENTION

The invention relates to graphic arts, facsimile and publishing techniques and, more specifically, to the systems reproducing an image by two tone levels for an each of the process (triad) colors. The invention can be used in graphic outputs and digital presses, in computer systems for graphic data processing, in facsimile and copier equipment.

DESCRIPTION OF THE RELATED ART

The so called screening is used in graphic arts printing, electrophotography and thermography, in matrix and ink jet printing to imitate the grey levels of a continuous tone (CT) original image. It comprises the variation of relative area occupied on a copy by the printing elements (halftone dots) and by the non-printing elements (blanks), i.e. by the dark and light elements. The minimum sizes of steadily reproducible halftone dots and blanks have a finite value dependent on a noise level in a system, which level is, in turn, dependent on the properties of the substrate on which to reproduce the image, as well as on ink, plate, toner, etc. With due account taken of these restrictions, the spatial frequency of halftone dots placement should not be excessively high because their relative areas should be free to vary in sufficiently large margins to thereby assure the desired number of gradations that can be reproduced. At the same time, insufficient screen frequency or screen ruling (measured in lines per inch—1 pi) will limit image definition and sharpness with distortion of fine details and contours by the halftone dots.

To simultaneously satisfy the contradictory requirements of improving both the definition and tone rendering, a principle of adaptive screening is used, which selectively, with taking into account the specific of particular image area or the so called busyness thereof, changes its properties to meet on of said requirements to a greater or a lesser extent (Yu. V. Kuznetsov, V. A. Uzilevski. Electronic Screening in Graphic Arts. "Kniga", Moscow, 1976 (Russ.)). As in the number of optimal encoding solutions for transmitting or withdrawing redundancy of CT image data, the psycho-visual premise for an adaptive approach here lies in the well known relation between the contrast or sensitivity threshold of vision and the dimension of a detail or the upper spatial frequency of an image pattern. This specific is successfully used in color TV to transmit the chromaticity component of video signal within the narrower frequency band as compared with that used for the brightness component.

There is known prior-art method for adaptive screening (SU 1634119, U.S. Pat. No. 5,229,867, GB 2249910, DE 4037319) the CT original presented by the signal of optical parameter (tone value) of its areas in periodic structure of relatively low spatial frequency. In this method the substrate areas corresponding to the areas of the original and intended for reproduction of an image, are divided into elements which form a periodic structure of relatively high spatial frequency. Each element of a substrate, according to its orthogonal coordinates X and Y on a substrate area, is assigned one of the weight values. These values are normalized upon the scale of input multilevel tone values and distributed between the elements in a manner providing the smooth tone rendition, the distribution of these weights element-wise being identical within the margins of an each area. While forming halftone copy, the weight of each element is compared with the tone signal value of the original area corresponding to the substrate area. Element is formed dark, if its weight differs from tone value in one direction, and is formed light otherwise.

To improve the quality of a contour reproduction, this method provides the displacement of halftone dots comprised of printing elements on the areas intersected by contour. The dots are displaced towards the darker part of the image divided by the contour—increasingly so with increasing the contour contrast—by way of correcting the weight value addresses as indicated by analysis of ratio of tone values signal of the original area corresponding the substrate area to be formed and the adjacent original areas.

Owing to the halftone dots displacement, the method according these patents assures better contours reproduction. Nevertheless, these contours are not free from the stepwise distortion as far as they are formed by the halftone dots of relatively low spatial periodicity. At the same time, the relatively high spatial frequency of substrate area elements might allow of better contour rendition, considering that in the types of methods under discussion it is an order of magnitude higher than that of areas. The unsatisfactory quality of contour reproduction in said method and device is associated with the halftone dot size being dependent on the averaged value of the tone signal of an area, for example, of the reflection coefficient thereof. It is for this reason that for an area of an original, having uniform grey tone, and for an area divided half dark and half light, the halftone dot size will be the same. The dot shape will like-wise be the same, because the distribution of weight values for the elements in all the areas will be identical, being selected to achieve smooth tone rendition within zones where the tone changes but slowly and where the sensitivity threshold of vision is particularly small. Therefore, the halftone dot or some part thereof, both composed of a multiplicity of elements, becomes the minimum spatial discrete unit to define the geometrical accuracy of reproduction of a contour or a fine detail, rather than an individual element, whose size ultimately determines the resolution of the output device or the printing process as a whole.

This potential of printing process is better used to provide the higher quality of contour reproduction with preserving the tone rendition continuity, the volume of an image signal and the time of its processing in the method disclosed in our patents RU 2126598; UK 2300328; U.S. Pat. No. 5,822,086; DE 4498946.

In one of the embodiments of this method for adaptive screening of a CT original the presence or absence of a contour is ascertained in the original area corresponding to a given substrate area. With a contour being present, said area is estimated for its relative busyness and each element of corresponding substrate area is assigned one of the second weight values $P_2$, all selected so as to achieve geometric accuracy of contour reproduction. A first supplementary value $S_1=qS$ and a second supplementary value $S_2=(1-q)S$, where S is the tone signal value of given original area, q is the relative busyness. Each element of the given substrate area is formed dark if its first weight $P_1$ exceeds the first supplementary value $S_1$ and/or if its second weight value $P_2$ exceeds the second supplementary value $S_2$ and is formed light if its first weight $P_1$ does not exceed the first supplementary value $S_1$ and its second weight $P_2$ does not exceed the second supplementary value $S_2$.

In this method the significance of second weight values, as far as the process of forming substrate elements as printing or non-printing is concerned, increases with increasing busyness q of original area while the significance of first values decreases and vice versa. The significance of specific weights is accounted for through the use of the supplementary values $S_1$ and $S_2$ which are dependent upon the relative busyness value. The greater the busyness of an original area, the greater number of elements that will be formed dark or light within the corresponding substrate area, based on the comparison of their second weights with the $S_2$ value; the lesser the busyness level, the greater number of elements that will be formed dark or light, based on the comparison of their first weights with the $S_1$ value. In this way both of the essential requirements for continuous tone original screening—smooth tone rendition and accurate contour geometry reproduction—are satisfied. However, these methods do not completely use the printing process facilities to render thin lines which thickness is less than the width of an area of input multilevel sampling value. The investigation has shown that this method reproduces such lines with the use of not only the second kind of element weights. As far as the busyness q comprises for such areas the value less of the unit, the weights of the first kind are also used, in spite of the latter being predetermined for the stationary (background) image area. The reason is comprised in that, even for the lines of a full contrast (black lines on a white background or white lines on a black background), the multilevel tone value of a sample doesn't achieve the extreme meaning (for example, 0 or 255 at eight bit encoding of optical parameter) due to the so called aperture distortion at the stage of an image capturing where tone value is averaged over the sampling area.

Therefore the need still exists in greater use of a printer resolution to improve the quality of an image fine detail reproduction and, in particular, that of an image thin line.

SUMMARY OF THE INVENTION

The goal of given invention is comprised in creating the method for adaptive screening a CT original which allows for increasing the accuracy of thin lines reproduction, the definition and sharpness of a print due to the greater use of printing resolution during the transformation of a multilevel input tone values $S_A$, $S_B$, $S_C$, $S_D$ . . . of its areas A, B, C, D . . . into a bi-level values of dark and light elements a, b, c, d . . . of a copy. To achieve this goal the proposed method of adaptive screening of CT original, presented by the multilevel values of optical parameter (tone value) of its areas of relatively low spatial frequency, is comprised in that the copy substrate areas, corresponding to the areas (A, B, C, D, E, F, G, F, H, I) of the original, are divided into elements of relatively high spatial frequency. Each element of a substrate is assigned one of the first weight values ($P_1$). These values are normalized in accordance with a multilevel scale of input tone values and selected at condition of providing the required smooth tone rendition. The presence of detail (1) on original area (E) corresponding to given substrate area is detected. With no detail (1) on original area (E) each element of said substrate area is formed dark, if its first weight ($P_1$) exceeds the optical parameter sampling value SE of said area (E) of an original, and is formed light, if the first weight ($P_1$) of said element doesn't exceed the value SE of said area E. When detail (1) is present on the given area (E) of an original the each element of the corresponding copy area is assigned one of the second weight values ($P_2$). These values are also normalized in accordance with a multilevel scale of input multilevel tone values and selected at condition of providing the required accuracy of detail geometry reproduction. The first and the second supplementary tone values $S_1$ and $S_2$ are determined for the original area containing a detail (1). Each element of the corresponding copy area is formed dark or light as result of comparison of the first weight ($P_1$) of the element with the first supplementary tone value $S_1$ and of the second weight ($P_2$) of said element with the second supplementary tone value $S_2$.

The method is characterized in that the presence of detail comprising two boundaries which divide given area on its darker and lighter parts is detected. Then there is determined if the section located between two boundaries is darker or lighter than the outer to these boundaries part. If the detail comprises just one boundary dividing the area and the tone value $S_E$ of said original area (E) exceeds the predetermined threshold, or, if the detail comprises two boundaries dividing the area and its inner section is lighter of the outer part, the supplementary tone values are further defined as $$S_1 = \max(S) \text{ and } S_2 = S_{max}(1 - (\max(S) - S_E)/\max(S)),$$

where $S_{max}$ is maximum possible tone value, max(S) is maximum value of sampling areas—adjacent to the given area (E), Each element of the corresponding substrate area is formed dark, if its first weight ($P_1$) exceeds the first supplementary tone value S1 and if its second weight ($P_2$) exceeds the second supplementary tone value $S_2$. Otherwise the element is formed light.

When the detail comprises just one boundary, but the tone value $S_E$ of given original area (E) doesn't exceed the predetermined threshold, or when said detail comprises two boundaries, but the section located between these boundaries is darker of the outer part, the supplementary tone values are defined as $$S_1 = \min(S) \text{ and } S_2 = S_{max}(S_E - \min(S))/(S_{max} - \min(S)),$$

where min(S) is minimum value of tone values of sampling areas adjacent to the given area (E). Each element of the corresponding substrate area is formed dark, if its first weight (P1) exceeds the first supplementary tone value S1 or if its second weight (P2) exceeds the second supplementary tone value S2. Otherwise the element is formed light. The second weight values ($P_2$) are assigned to an each element of a substrate area by forming the set of matrixes of mxn elements, these weights being distributed within an each matrix in the predetermined order corresponding to one of the typical configurations of detail intended for reproduction on a copy. Then the set of said matrixes is divided on two pluralities, the first of them (3) including the matrixes of weight distributions, which correspond to the detail forming on an original the single boundary (1) dividing the area on light and dark parts, and the second plurality (4) including the matrixes of weight distributions, which correspond to the detail forming two such boundaries (2) on an original. The second of said pluralities (4) is subdivided on two subsets, the first of them (6) including the matrixes of weight distributions, which correspond to the presence between said boundaries of a section which is lighter than an outer region, and the second of these subsets (5) including the matrixes of weight distributions, which correspond to the presence between said boundaries of a section which is darker than an outer part of an image. Then the matrix, which weights distribution corresponds to the geometry of an original detail to be reproduced, is selected from the first of said pluralities or from the one of said subsets by comparison of multilevel values of a given and of an adjacent sampling areas. The weight values of the selected matrix are used as the second weights ($P_2$) when forming the copy corresponding area.

The presence of a single boundary or of two boundaries, dividing the reproduced area of an original, is detected by the belonging of selected matrix correspondingly to the first or to the second of said pluralities.

If lighter or darker is the section of reproduced original area, located between said two boundaries, than the outer to these boundaries part is detected by the belonging of selected matrix correspondingly to the first or to the second of said subsets.

The proposed method provides the greater accuracy of rendering the fine detail of CT original on its halftone copy due to the additional, in relation to the prior art, operation of detecting the kind of detail (the single boundary dividing a reproduced area onto light and dark parts or the thin line with its edges comprised of a couple of such boundaries) in conjunction with the novel variants of generating the supplementary tone values $S_1$ and $S_2$.

BRIEF DESCRIPTION OF THE DRAWINGS

The invention is hereinafter made more fully apparent through a detailed description of examples of its embodiment, with due references to the accompanying drawings.

DETAILED DESCRIPTION OF THE INVENTION

Figure 1:
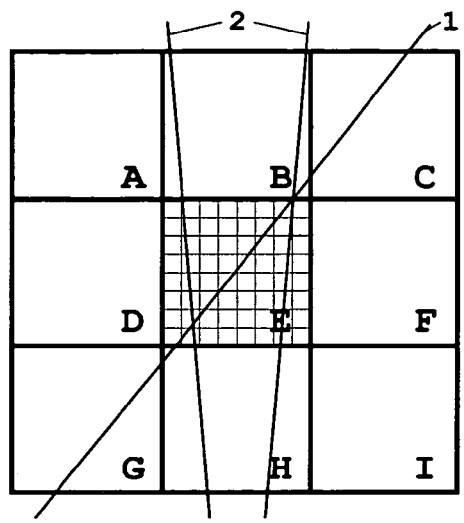
FIG. 1 illustrates the mutual placement of an image areas (A, B, C . . . I) and the one (1) and two (2) detail boundaries dividing the reproduced area (E) onto the dark and light parts, where the double boundary (2) forms a thin line.

According to this invention the method for adaptive screening a continuous tone original is comprised in that the latter is divided by areas, for example, in form of squares located in the orthogonal grid. The substrate, whereon an image copy is to be formed, is also divided by the same number of such areas located in similar order to have the particular area of an original being corresponded to an each substrate area. Nine of such, adjacent to each other, areas A, B, C . . . I, which can be considered both as the original areas and as the copy areas, are shown on FIG. 1, these copy and original areas being rather large, i.e. having the relatively high spatial frequency. The copy areas are, in their turn, subdivided by the smaller parts (named herein below as elements) of a greater spatial frequency as compared with that of the areas. FIG. 1 shows, as an example, the division of a central E of nine copy areas by 64 elements, though the amount of elements on the copy area may be less or higher than 64. The halftone image is created on the substrate by forming the each of its elements dark or light.

Each area of an original is presented in the input image data by some of multilevel values of an optical parameter, the latter may comprise the reflectance, absorbance, transmittance, optical density, etc.

In digital image signal presentation the quantization scale for such parameter may account 64, 128, 256, etc. levels corresponding to 6, 7, 8, etc. digits of a binary code. To simplify the below described examples the quantization scale of 64 levels is used, i.e. the sampling values can vary from 1 to 64. There is the absorbance used as an optical parameter, which multilevel samples present the CT original to be screened. If the sampling value (quantization level) is proportional to the absorbance averaged over sampling area (area of an original), the equal to this value amount of the elements of a copy corresponding area is formed dark and the number of elements of the same area to be formed light is 64 minus amount of the elements, which were formed dark. At sampling value equal, for example, to 16, the 16 elements of a substrate area are formed dark and the rest 48 its elements are formed light. The relative area occupied by the dark elements ("tone value" according to ISO 12 647) comprises in this case 25%.

The quantization scale dimension and the number of elements dividing the copy area may not generally coincide. Moreover, when even the absorbance is used as an optical parameter, the dependence of amount of area elements to be formed dark or light from the sampling value of the corresponding original area may be non-linear due to the specific of colorant interaction with substrate material. However, this amount is, in any case, in the rigid connection with the sampling value of corresponding original area.

Being predetermined for an each copy area element, the so called weight values are used to determine which of these elements should be formed dark or light. These weights distribution within an area can be the same for all areas and set at condition of providing the continuous rendering of the maximum possible number of tone gradations of an original which excludes the visible banding. These weight values, named below as the first weights ($P_1$), can, for example, monotonously decrease from the center of an area to its bounds or be randomly located within an area. The monotonous first weights $P_1$ distribution over the area elements is numerically presented on FIG. 2a by the 8×8 matrix. It should be noticed that these weights are numbered in the range from 1 to 64, i.e. are normalized according to the multilevel sampling scale assumed for the given example of method description.

The variants of such weights distribution over the elements and the procedures of detection of a contour presence or absence are, for example, described correspondingly in our U.S. Pat. Nos. 5,229,867 and 5,822,086.

Figure 2:
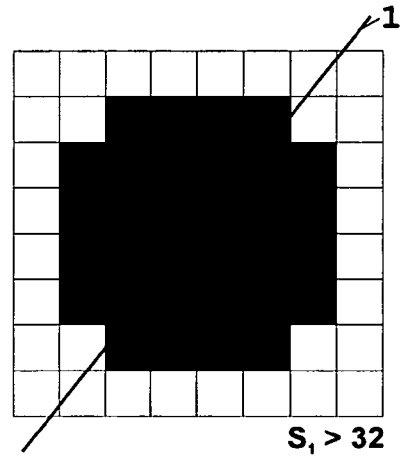
FIG. 2 shows the matrix (a) of first weight values ($P_1$) and the copy area (b) filled by the light and dark elements when these values are used to reproduce a detail which is presented by one boundary (1) within this area.

When contour is absent on the original area corresponding to given copy area, the first weight of each element is compared with the sampling value of said original area. If the first weight ($P_1$) of an element exceeds the absorbance sampling value of original area corresponding to the copy area containing this element, the latter is formed dark. Otherwise, it's formed light. With the first weights ($P_1$) distribution corresponding to that shown on FIG. 2a, the dark elements form the so called halftone dot, its area depending on tone of related areas of an original image. FIG. 2b shows the example of a halftone dot of 50% relative area, this dot being formed according to the sampling value of 32. All the elements, whose first weights exceed 32, there are formed dark. With all of the elements of given substrate area have been formed the other its areas are processed using the same kind of weights, however, in combination with the tone sampling values of the corresponding areas of an original. The "window" of samples comprised, for example, of nine areas, as shown on FIG. 1, is shifted by step equal to the size of an area.

The sampling value of an each area is used to be produced, when scanning (capturing) the original image, as the average reflectance of an area. Such averaging results in the low pass filtration of an image spatial frequency. So, the sampling value turns out to be the same for the uniform area with reflectance 0.5 and for the area divided by the contour on two equal black and white parts (FIG. 1). When just the first weights ($P_1$), intended for the best tone rendition, are used to form a copy, the halftone dot destroys such contour. As it's seen on FIG. 2b, the significant part of a dot is located at the side of a substrate area, which is related to the light section of an original.

Therefore, with contour being present on the area of an original the each element of the corresponding substrate area is additionally assigned by one of the second weight values ($P_2$) intended for the accurate contour geometry reproduction on a copy. Unlike the first weights, the weights of the second type may be distributed among the substrate area elements in different manner, which depend on the contour form and orientation on an area (the linear contour can, for example, have vertical, horizontal or inclined position).

Figure 3:
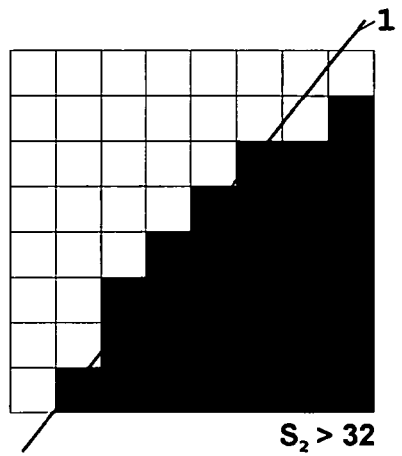
FIG. 3 shows the matrix (a) of second weight values ($P_2$) and the copy area (b) filled by the light and dark elements when these values are used to reproduce a detail which is presented by one boundary (1) within this area.

The second weights $P_2$ distribution for the substrate area, which corresponds, for example, to area E divided by the contour to the dark left part of minimal reflectance and the light right part of maximum reflectance, is presented on FIG. 3a as the matrix of numbers assigned to an each area element. Such contour of maximum contrast is related to the so called Line Work (LW) image and there is no need in the weights of the first kind. The sampling value of an original are containing the contour is compared with the second weights of the elements of corresponding substrate area and the elements whose weights exceed said value are formed dark while the elements whose weight doesn't exceed said value are formed light. In given example, where the sampling value of the area comprises 32, those elements are formed dark whose weights are greater than 32. That provides the most accurate contour reproduction, as shown on FIG. 3b at the complete use of the plate making and printing process resolution, the latter comprising, for example, as much as 2500 dpi.

Generating a halftone copy with the use of just the first weight values meets in the best way the requirement of faithful tone rendition while the use of just the second weights provides the highest geometric accuracy of fine detail reproduction. Meanwhile, the real CT original contains the great variety of contours. This variety may comprise the sharp contours of an intermediate contrast as well as contours of a full contrast but having some gradual transition from light to dark parts which they are dividing. In many cases the contrast and sharpness of said transition may gradually fade along the contour. That's why the halftone image formation with the use of just the second weights, providing the maximum contour sharpness and contrast, makes the copy unfaithful. At the same time the abrupt change of the way of a copy formation from the use of just one kind of weights to the use of just the other weights results in the visible noise on a copy due to the stepwise variation of the inked area geometry.

To simultaneously address the requirements of both smooth tone rendition and contour reproduction accuracy for the CT original, which contains all the variety of contours, our U.S. Pat. No. 5,822,086 teaches, in one of its method embodiments, to divide the multilevel sampling value S of an original area, corresponding to a substrate area to be formed, on to two supplementary values S1 and S2 according to equations $$S_1 = qS$$

$$S_2 = (1-q)S, \qquad (1)$$

where q is the relative busyness (activity index) of an area. This index may comprise the maximum of the modules of differences among the pairs of sampling values of areas adjacent to the reproduced area, this module being divided by the maximum possible sampling value Smax. The first weight $P_1$ of an each element of an area to be formed is compared with the value $S_1$ and second weight $P_2$ of an element is compared with the value $S_2$. The element is formed dark if its $P_1$ exceeds $S_1$ or/and its $P_2$ exceeds $S_2$. Otherwise the element is formed light.

The dividing of the sampling value on two supplementary components is inherent in halftoning methods which are adaptive to local tone gradient. So, the equations (1) including the busyness or activity index one can meet in our SU patent 1246408 (appl. 1982) and in the HP EP application 0946049 of 1998.

FIG. 4a illustrates the reproduction of a sharp contour of intermediate contrast with the use of just the first weights $P_1$, while the FIG. 4b shows the same contour reproduced with the use of the both kinds of weights. Sampling value of area A, which is entirely located on the darker side to the left from contour 1, comprises 48, while the values for areas F, I and H, which are entirely located on the lighter side to the right from contour 1, comprise 16. The halftone dots of 25% and 75%, comprised of correspondingly 48 and 16 dark elements, relate on a copy substrate to these sampling values.

As follows from FIG. 4a, the multilevel absorbance values of areas B, C, D, E, G, intersected by contour 1, comprise correspondingly 40, 24, 40, 24, 24 and the same amounts of elements are formed dark on the corresponding substrate areas. Each of the B, C, D, E, G areas has a pair of an adjacent to it areas, one of them being entirely located on a darker side of an image, i.e. having the value of 48, and the other being entirely located on lighter side of an image, i.e. having the value of 16. For area E such a pair is, for example, comprised of the dark area A and of the light area I. Far area D such pair consist of areas A (dark) and H (light). So, the relative busyness q for any of said areas, intersected by the contour 1, comprises q=(48−16)/64=0.5. According to equation (1) that makes $S_1 = S_2 = 12$ for the area E which sampling value is equal to 24.

The dark elements, which were formed as result of comparison of first weights $P_1$ with value $S_1$ and as result of comparison of second weights $P_2$ with value $S_2$, are hatched correspondingly in one and in both directions on FIG. 4b.

The comparison of images on FIG. 4a and FIG. 4b shows that the dark elements position on areas B, C, D, E, G of FIG. 4b in greater degree matches the contour 1 geometry. At the same time, some of the elements on said areas of FIG. 4b to the right from the contour 1 are formed dark and some elements to the left are formed light which corresponds to the intermediate contrast value of the original image boundary to be reproduced. Nevertheless, at satisfactorily, as was shown in the above example, reproduction of a single boundary, dividing an area on dark and light parts, the determining of supplementary values $S_1$ and $S_2$ by equation (1) according to the mentioned patents doesn't allow for the same accurate reproduction of a thin line. This line, as shown on FIG. 5(a) and 5(b), is comprised of two such boundaries. The line may have the maximum reflectance on an original, i.e. to be white on a black background and vice versa. So, it would be purposeful to use just the second weight values $P_2$ for its most accurate reproduction on a halftone copy.

However, the busyness q is in such a case less than 1.0 as far as the multilevel sample $S_E$ Of a reproduced original area has not the extreme (1 or 64 for given example) value, but some intermediate one averaged over the sampling area. Hence, such a line is reproduced according to the U.S. Pat. No. 5,822,086 with the use of both the second and first weight values. For area E this is illustrated on FIG. 5c, where the copy elements, formed dark in accordance with the first weights, are placed aside of a line.

The applying of just the second weights is also useful for the "grey" thin lines, i.e. for the lines which have some intermediate reflectance value on an original image. Such line is shown on FIG. 5b. If it happens that in the particular, for simplicity of example, case this line produces the same sampling value $S_E$ as the sample of thinner but darker (black) line of FIG. 5a, the both lines can be reproduced on a copy in the same way, i.e. as illustrated on FIG. 5c. As follows from the earlier mentioned specific and as our experiments has confirmed, the variation of tone can be compensated on a copy by changing the thickness for the lines whose width is less than tens parts of millimeter on an illustrative print. From the other hand, much more critical for visual perception is the distortion of a line by the printing elements which are formed dark according to mentioned patent with partial use of the first weights and are, hence, concentrated on a copy around the centers of regular screen greed or randomly placed in stochastic (non-periodic) screen structure. Therefore, the illustrated on FIG. 5d reproduction of a thin line with the use of just the second weight values looks more faithful. It should be mentioned here, that each of two boundaries of wider lines and angles, which entirely cover the sampling area, stay to be reproduced as a single boundary 1, i.e. according to the prior art or, as was described in above example, by the proposed method.

Figure 6:
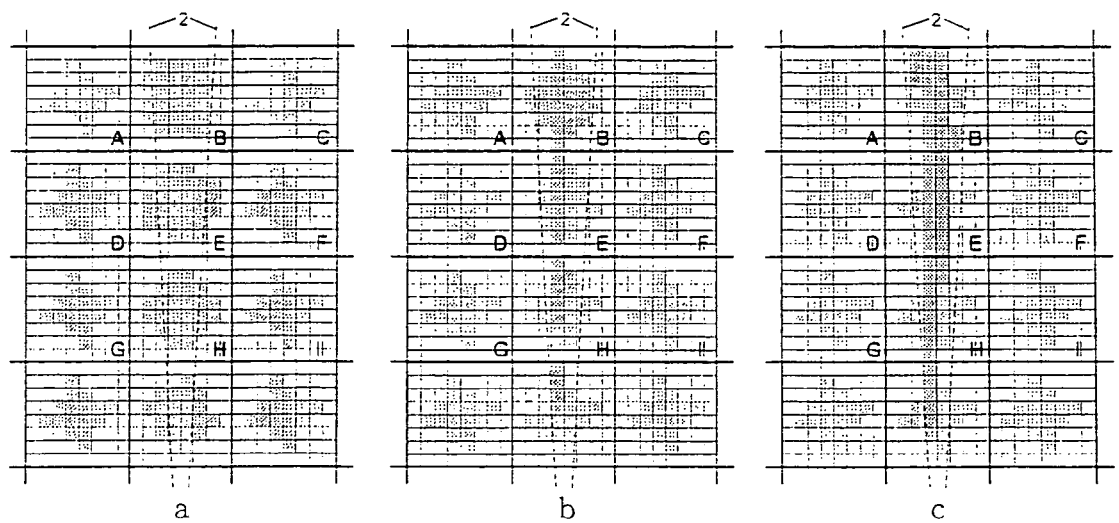
FIG. 6 illustrates the use of just the first ($P_1$) weights (a), of combination the first ($P_1$) and second ($P_2$) weights by prior art (b) and by proposed method (c) to reproduce the dark line comprising two boundaries (2) dividing the area (E) onto dark and light parts.
Figure 7:
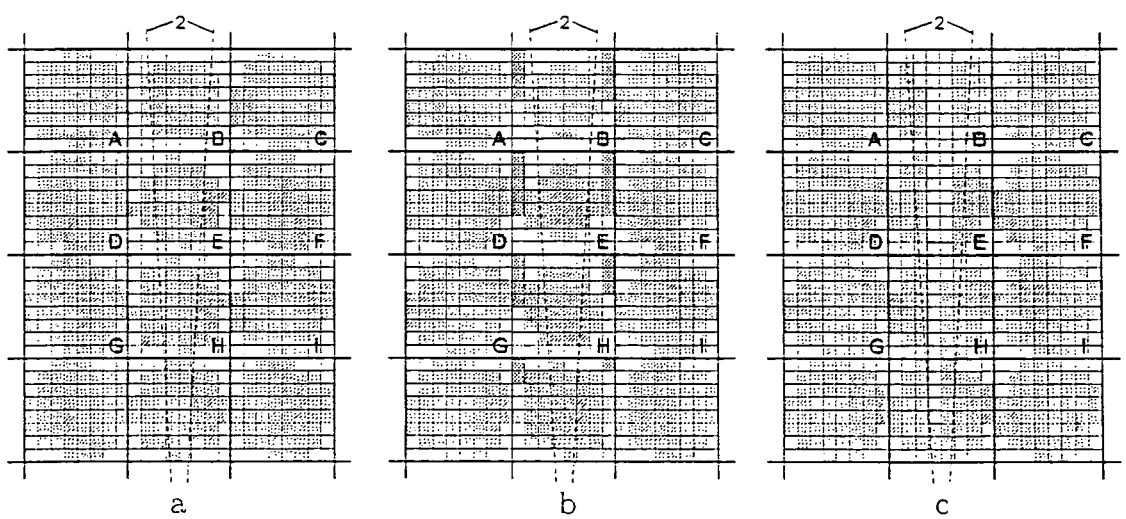
FIG. 7 illustrates the use of just the first ($P_1$) weights (a), of combination the first ($P_1$) and second ($P_2$) weights by prior art (b) and by proposed method (c) to reproduce the light line comprising two boundaries (2) dividing the area (E) onto dark and light parts.

Variants of reproduction of a dark line on lighter background and of a light line on darker background are correspondingly illustrated on FIG. 6 and FIG. 7. The minimum and maximum reflectivity values comprise 25% and 75% among the group of areas presented on these figures.

FIG. 6a shows the reproduction of thin line comprised of two boundaries 2 dividing the image to darker and lighter parts. Inner part of this line has reflectivity 25% while its outer part has reflectivity 75%. So, the areas B, E and H, which contain the line, have some intermediate (between 12 and 48) input sampling values due to the reflectivity averaging over an area when capturing the image by some input device. These values are changing along with varying of the line width and comprise correspondingly 32, 28 and 24. The overall amount of elements to be formed dark on corresponding halftone copy areas comprises 32, 28 and 24.

Figure 4:
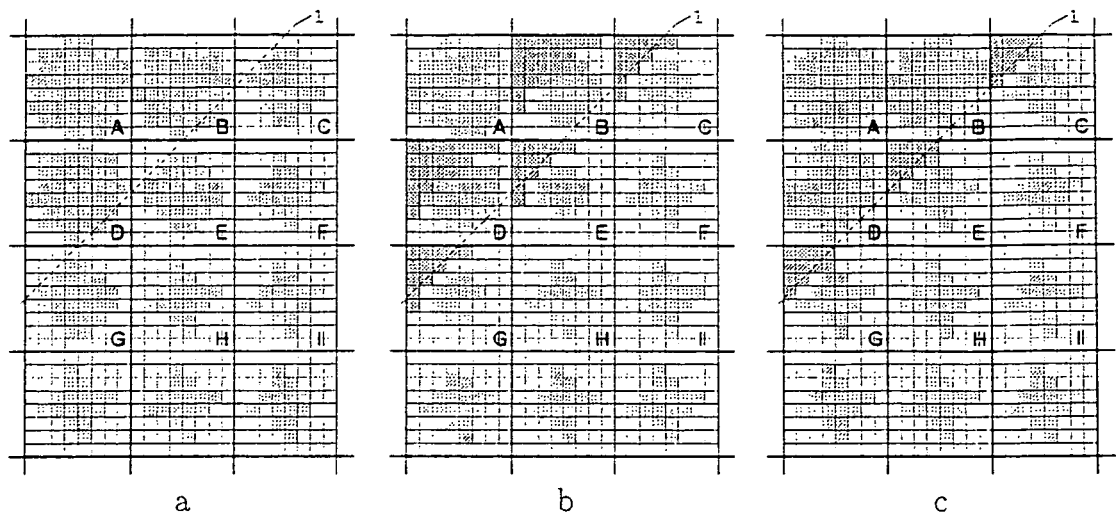
FIG. 4 illustrates the use of just the first ($P_1$) weights (a); of combination the first ($P_1$) and second ($P_2$) weights by prior art (b) and by proposed method (c) to reproduce the single boundary (1) dividing the area (E) onto dark and light parts.
Figure 5:
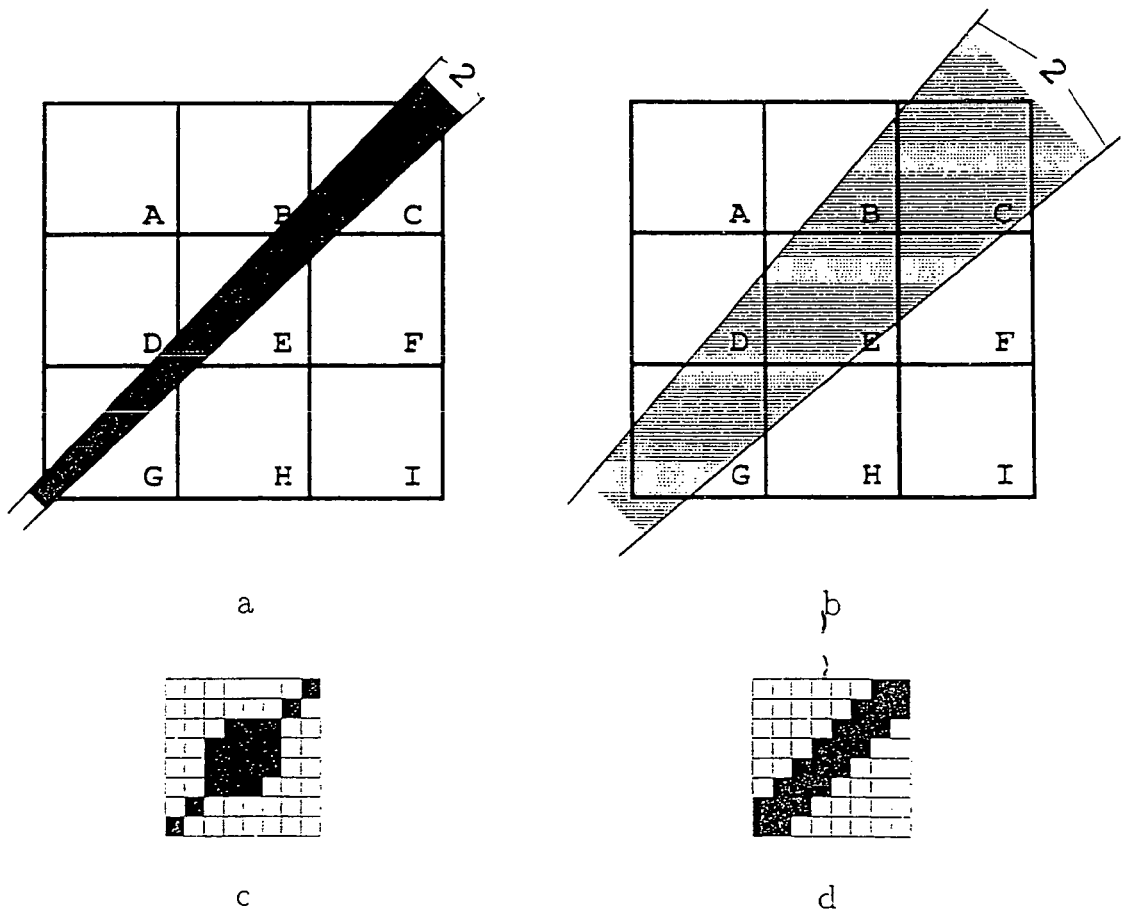
FIG. 5 shows the thin black line (a) and thicker grey line (b) producing the same reflectance sampling value due to averaging of the latter over an area of CT original and halftone copies of these lines according the known (c) and proposed (d) methods.

In the given example, unlike one illustrated by FIG. 4, there are no sampling values of 12 and 48. So, the busyness (activity) index q calculated for area E according formula (1) is just 0.25 instead of 0.5 in spite of the contrast of a detail in the both cases comprising 0.5. That is why just 7 elements are formed dark on the halftone copy area E with the use of the second weights $P_2$. These elements are marked on FIG. 6b by the double hatching. It's evident that the use of these weights is further decreasing as the line becomes narrower. Even more unfaithful, as shown on FIG. 7b, is the light line reproduction in accordance with the prior art. In spite of the same, as in the case of a dark line, degree of the second weights use, the central part of this light line stay filled by the dark elements.

To improve the halftone reproduction accuracy for graphic element of a continuous tone original it is intended, according to the proposed invention, to determine if the detail located on reproduced area (E) of an original is comprised of one or two boundaries dividing this area on darker and lighter parts. In other words it means to detect if this detail is the contour 1 or the thin line comprised of two such contours 2 within the margins of an area. One of the ways of such detecting will be concerned below.

When the detail is comprised within an area by two boundaries dividing it on darker and lighter parts, i.e. the detail is a thin line, it is determined, according to the proposed invention, if the section, located between these boundaries, is lighter or darker than the outer part. In other words, it is detected if the reproduced line of an original is light on a darker surround or it is dark on a lighter surround. One of the ways of such detecting or determining the "polarity" of a line will be also concerned below.

If the detail comprises a single boundary transition with sampling value $S_E$ of given area E exceeding the predetermined threshold and if the detail comprises the thin light line, the supplementary signal values are determined, according to proposed invention, as $$S_1 = \max(S)$$

and $$S_2 = S_{max}(1 - (\max(S) - S_E)/\max(S)), \quad (2)$$

where $S_{max}$ is the maximum possible tone value, max(S) is the maximum value of an adjacent sampling areas (A, B, C, D, F, G, H, I). At these conditions the each element of corresponding substrate area is formed dark if its first weight $P_1$ exceeds the first supplementary tone value $S_1$ and its second weight $P_2$ exceeds the second supplementary tone value $S_2$. Otherwise the element is formed light.

If the detail comprises a single boundary transition with sampling value $S_E$ of given area E not exceeding the predetermined threshold and if the detail comprises the thin dark line, the supplementary signal values are determined, according to proposed invention, as $$S_1 = \min(S)$$

and $$S_2 = S_{max}(S_E - \min(S))/(S_{max} - \min(S)), \quad (3)$$

where min(S) is the minimum value of an adjacent sampling areas (A, B, C, D, F, G, H, I). In these circumstances the each element of the corresponding substrate area is formed dark, if its first weight ($P_1$) exceeds the first supplementary tone value $S_1$ or if its second weight ($P_2$) exceeds the second supplementary tone value $S_2$. Otherwise the element is formed light.

Figure 8:
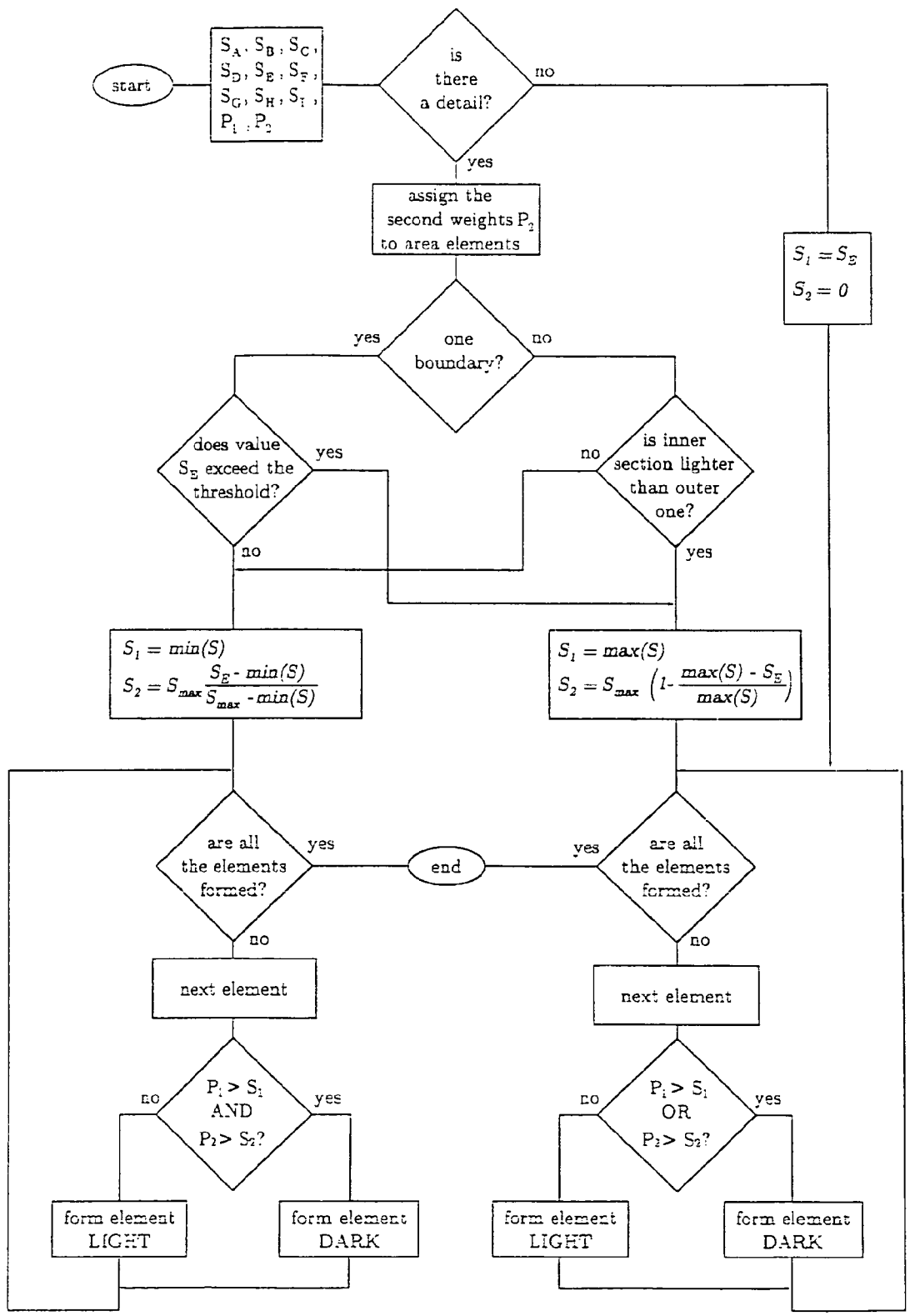
FIG. 8 is the flow chart illustrating the procedures of the proposed method.

Logical illustration of these procedures application to the tone values S of original image areas and to the weight values P of copy areas elements is presented on FIG. 8.

The proposed method advantages of determining the supplementary tone values $S_1$ and $S_2$ according the equations (2) and (3) and of forming the elements dark or light according the above conditions are below described with examples illustrated on FIG. 4c, FIG. 6c and FIG. 7c.

According to equation (3) the second supplementary value $S_2$ for area E is $S_2=64(28-16)/(64-16)=16$, but not 7 as in known method. So, due to the proposed way of this value defining, the degree of the second weights use becomes greater (FIG. 6c) than in known method (FIG. 6b). Value $S_2$ becomes greater for it doesn't depend on tone value of an area containing the detail, but depends on tone of the outer, background part of an image (areas A, D, G, C, F, I) and the geometric accuracy of this detail reproduction increases.

The example, which is similar to the discussed above but inversed in relationship of tone values of inner and outer parts of a line, is illustrated on FIG. 7. The second supplementary value $S_2$ for area E is defined here according to equation (3) as $S_2=64(1-(48-36)/48)=48$. There is the simultaneous meeting of conditions: $S_1>P_1$ and $S_2>P_2$ required as far as the reproduced line is light or, in the other words, its outer part is darker than its inner one. So, the value $S_2=48$ guaranties that the 16, i.e. (64-48), elements will be formed light on a substrate area and the selected geometry of the second weights distribution will secure these light elements position inside the line boundaries 2 as shown on FIG. 7c.

FIG. 4c illustrates the favorable effect of condition which makes some elements to be formed light when the sampling value of an area, intersected by the one boundary transition, exceeds the threshold value, for example 50%. Instead of forming of a portion of elements dark at the opposite, lighter part of transition on FIG. 4b, the same elements, marked on FIG. 4c, are formed light.

Figure 9:
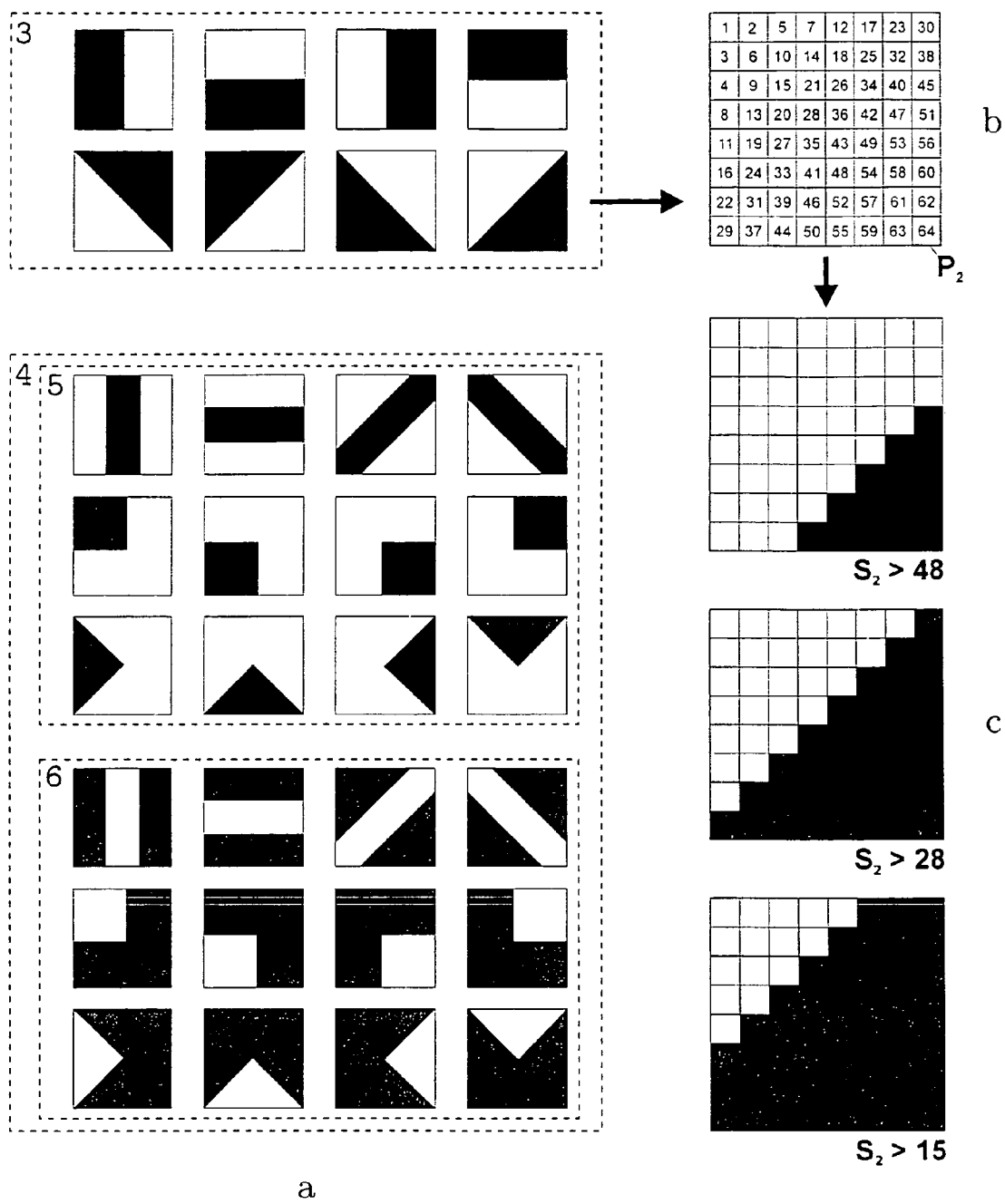
FIG. 9 shows the exemplary geometries (a) of an image fine details with their first plurality 3 and second plurality 4 divided onto the subsets 5 and 6; the second weights matrix (b) for one of these geometries; the halftone copy areas (c) which are filled by the dark and light elements with the use of these weights and in accordance with the three exemplary tone values.

Second weight values may be assigned to copy area elements by forming the set of these values matrixes having the dimension of mxn elements. Geometries of such values distribution are exemplary shown on FIG. 9a. FIG. 9b presents one of the matrixes. Having the dimension of 8×8 elements the latter illustrates weights distribution which corresponds to one of the predetermined types of detail geometries intended for reproduction on a halftone copy. FIG. 9c gives three examples of copy areas filled by the dark elements with the use of this matrix weights at tone values 48, 28, 15.

This set of matrixes is divided on two pluralities. The first one 3 includes the matrixes which weights distributions correspond to details comprising the single boundary transition from the lighter to the darker part of an image within its unit sampling area. The second plurality 4 includes the matrixes which weights distributions correspond to details forming two such boundaries on an area. This second plurality is subdivided on two subsets with the first of them 5 including the matrixes which weights distributions correspond to the presence of a lighter image tone between these boundaries in relation to their outer part. The second subset 6 includes the matrixes which weights distributions correspond to the presence of a darker tone of an image between these boundaries.

Various methods of the image processing technique may be applied to detect if the detail geometry on a reproduced area relates to the first 3 or to the second 4 of said pluralities and, in the latter case, if this geometry corresponds to that of the first 5 or of the second 6 subsets. As related to the purpose of this invention, all of these methods are anyway relied upon the rather hard correlation between the detail geometry on a reproduced area and the tone value relationships of this and adjacent to it areas.

It is, in particular, possible to attribute the sought for matrix to the first or to the second of said pluralities with the use of a look-up table (LUT) bounding up given matrix and relationships (greater, fewer) in these or other pairs or combinations of tone values of the given and adjacent sampling areas.

Similarly, there is possible to identify if the detail geometry of an original image corresponds to the first or to the second of said weights distribution subsets.

The sequence of logic operations comparing the relationships of sampling values within their "window" can be applied to relate the original image detail to the geometrically nearest weights distribution within the first of matrix pluralities or within the first or the second of matrix subsets. This can be also performed by the mentioned above LUT method.

With the particular matrix being selected its weights are used in the proposed invention to form the copy elements dark or light as was hereinabove described. The presence of one or two boundaries on a reproduced area of original image as well as darker or lighter is the part of an image located on this area between said two boundaries are correspondingly determined by belonging of the selected matrix to the first or the second of said pluralities and to the first or the second of said subsets.

ADVANTAGES AND INDUSTRIAL APPLICABILITY

Thus, the suggested complex of procedures over the optical parameter values of continuous tone original image areas and over the weight values of corresponding copy area elements allows for forming these elements dark or light with providing the greater, as compared to the known methods, graphic accuracy of contours and thin lines reproduction. Thereby, it significantly improves the output halftone image quality for the great variety of printing techniques and equipment.

We claim:

1. Method for adaptive screening a continuous tone original, presented by the multilevel sampling values of optical parameter (tone value) of its areas of relatively low spatial frequency, on a substrate, said method comprising:

dividing the copy substrate areas, corresponding to the areas of the original, into elements of relatively high spatial frequency;

assigning each element of a substrate one of the first weight values, all normalized in accordance with a multilevel sampling scale and selected so as to achieve the desired smooth tone rendition;

ascertaining the presence of detail on an original area corresponding to a given substrate area;

with no detail being present in the original area, each element of said substrate area is formed dark if its first weight exceeds the optical parameter sampling value of said area of an original and is formed light if the first weight of said element doesn't exceed the value of said area while;

with the detail being present in said original area each element of the given copy area is assigned one of second weight values, all normalized in accordance with a multilevel sampling scale and selected so as to achieve accuracy of detail geometry reproduction;

determining a first and a second supplementary tone value $S_1$ and $S_2$ for said detail-containing original area;

forming each element of the corresponding copy area dark or light as result of comparison of a first weight of the element with a first supplementary tone value $S_1$ and of the second weight of said element with a second supplementary tone value $S_2$; and wherein the presence of detail comprised of one or two boundaries dividing the given area on its darker and lighter parts is ascertained;

with a detail being present by two boundaries, there is ascertained if the section located between said boundaries is darker or lighter than the outer to these boundaries part;

in the event of the detail comprising one dividing boundary and the original area sampling tone value $S_E$ exceeding the predetermined threshold, or with the detail comprising two dividing boundaries and the section located between these boundaries being lighter of the outer part, the supplementary tone values are defined as $$S_1 = \min(S)$$

and $$S_2 = S_{max}(1-(\max(S)-S_E)/\max(S)),$$

where $S_{max}$ is maximum possible tone value, max(S) is maximum value of an adjacent sampling areas, and each element of the corresponding copy area is formed dark if its first weight exceeds the first supplementary tone value $S_1$ and if its second weight exceeds the second supplementary tone value $S_2$, otherwise the element is formed light;

in the event of the detail comprising one dividing boundary and the original area sampling tone value $S_E$ isn't exceeding the predetermined threshold, or with said detail comprising two boundaries and the section located between these boundaries being darker of the outer part, the supplementary tone values are defined as $$S_1 = \min(S)$$

and $$S_2 = S_{max}(S_E - \min(S))/(S\max - \min(S)),$$

where min(S) is minimum value of tone values of an adjacent sampling areas, and each element of the corresponding copy area is formed dark if its first weight exceeds the first supplementary tone value $S_1$ or if its second weight exceeds the second the supplementary tone value $S_2$, otherwise the element is formed light.

2. The method as defined in claim 1, wherein the second weight value is assigned to each element of given copy area
by forming the set of matrixes of mxn elements, the weights being distributed within an each matrix in the predetermined order corresponding to one of the typical configurations of detail intended for reproduction on a copy;

said set of matrixes is divided on two pluralities, the first of them includes the matrixes which weight distributions correspond to the details forming on an original the single boundary dividing the area to light and dark parts, and the second plurality includes the matrixes which weight distributions correspond to the details forming on an original two such boundaries;

said second plurality is subdivided on two subsets, the first of them including the matrixes which weight distributions correspond to the presence between said boundaries of a section which is lighter than an outer part, and the second of these subsets including the matrixes which weight distributions correspond to the presence between said boundaries of a section which is darker than an outer part;

the matrix which weights distribution corresponds to the geometry of an original detail is selected in accordance with the relationship of multilevel values of given sampling area and adjacent areas; weight values of the selected matrix are used as the second weights when forming the copy corresponding area.

3. The method as defined in claim 2, wherein the presence of a single boundary or of two boundaries, dividing the reproduced area of an original, is detected by the selected matrix belonging correspondingly to the first or to the second of said pluralities.

4. The method as defined in claim 2, wherein if lighter or darker is the section of reproduced original area, located between said two boundaries than the outer to these boundaries part, is ascertained by the belonging of selected matrix correspondingly to the first or to the second of said subsets.

* * * * *